United States Patent
Dammann et al.

(10) Patent No.: US 7,416,243 B2
(45) Date of Patent: Aug. 26, 2008

(54) DRIVER'S CAB SUPPORTING STRUCTURE FOR A COMMERCIAL VEHICLE HAVING A SAFETY CELL

(75) Inventors: Ruediger Dammann, Sindelfingen (DE); Gerd Herzog, Allmersbach (DE); Roland Stechow, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/582,475

(22) PCT Filed: Nov. 12, 2004

(86) PCT No.: PCT/EP2004/012832

§ 371 (c)(1),
(2), (4) Date: Apr. 24, 2007

(87) PCT Pub. No.: WO2005/061313

PCT Pub. Date: Jul. 7, 2005

(65) Prior Publication Data

US 2007/0267893 A1    Nov. 22, 2007

(30) Foreign Application Priority Data

Dec. 11, 2003    (DE) ................. 103 57 930

(51) Int. Cl.
*B60R 21/02* (2006.01)
*B62D 33/06* (2006.01)

(52) U.S. Cl. .................. 296/190.03; 296/187.03; 296/190.08

(58) Field of Classification Search ............ 296/187.09, 296/187.03, 187.08, 190.08, 187.11, 190.01, 296/190.03, 1.04; 280/756, 89.12
See application file for complete search history.

(56) References Cited

U.S. PATENT DOCUMENTS

| | | | | |
|---|---|---|---|---|
| 6,409,254 B2 * | 6/2002 | Tiziano | ................. | 296/190.08 |
| 6,520,565 B1 | 2/2003 | Kjellberg | | |
| 7,048,082 B2 * | 5/2006 | Mori et al. | ............... | 180/89.12 |
| 2004/0032149 A1 * | 2/2004 | Ljungquist et al. | ..... | 296/187.03 |
| 2004/0232731 A1 * | 11/2004 | Corcoran et al. | ............ | 296/205 |
| 2005/0116505 A1 * | 6/2005 | Carcioffi | ................. | 296/187.03 |
| 2007/0035148 A1 * | 2/2007 | Ellenrieder et al. | ........ | 296/35.1 |
| 2007/0035160 A1 * | 2/2007 | Murakami | ............. | 296/190.03 |
| 2007/0040414 A1 * | 2/2007 | Frederick et al. | ........ | 296/187.09 |

FOREIGN PATENT DOCUMENTS

| | | |
|---|---|---|
| DE | 28 53 621 | 12/1977 |
| DE | 101 24 271 A1 | 5/2001 |
| DE | 699 09 807 T2 | 4/2004 |
| EP | 0 685 381 A1 | 5/1995 |

(Continued)

OTHER PUBLICATIONS

English Translation of Chinese Office Action dated Nov. 16, 2007 (Six (6) pages).

*Primary Examiner*—Jason S Morrow
(74) *Attorney, Agent, or Firm*—Crowell & Moring LLP

(57) ABSTRACT

A driver's cab supporting structure for a commercial vehicle, particularly a heavy commercial vehicle, has a safety cell arranged in a driver's cab with a front region, and a rear side facing a loading region. A seating region is surrounded by a stiff, cage-like safety cell to which a deformation region for absorbing deformation energy is connected, between seating region and loading region.

10 Claims, 3 Drawing Sheets

FOREIGN PATENT DOCUMENTS

| | | |
|---|---|---|
| EP | 0 718 176 B1 | 11/1995 |
| EP | 1 117 583 B1 | 9/1999 |
| EP | 1 164 073 A1 | 5/2001 |
| JP | 09240515 A | 3/1996 |
| JP | 9-58531 A | 3/1997 |
| WO | WO 02/094642 A1 | 11/2002 |

* cited by examiner

DRIVER'S CAB SUPPORTING STRUCTURE FOR A COMMERCIAL VEHICLE HAVING A SAFETY CELL

This application is a National Phase of PCT/EP2004/012832, filed Nov. 12, 2004, and claims the priority of German patent document DE 103 57 930.3, filed Dec. 11, 2003, the disclosure of which is expressly incorporated by reference herein.

BACKGROUND AND SUMMARY OF THE INVENTION

The invention relates to a driver's cab supporting structure for a commercial vehicle having a safety cell, particularly a heavy commercial vehicle.

European patent document EP 0 718 176 B1 discloses a supporting structure for a driver's cab of a commercial vehicle, which includes the doors and is designed as a safety cell for driver and passenger. The driver's cab is reinforced and stiffened by a stiffening rib that is integral to the wall. Such all-round stiffening of the driver's cab is provided in three height positions: in the region of the driver's cab floor, in the region of the transition to the roof and in the railing region below the windshield. External forces acting in the horizontal direction can be counteracted in a specific manner in the three zones. The driver's cab is less deformed than in previously known solutions. To stiffen it, the front wall, rear wall and side walls of the driver's cab are reinforced by a profiling, using a pressing technique, of their inside and outside sheet-metal pressed parts, and by partial further reinforcement of the stiffening profile regions with additional sheet-metal pressed profiles. The reinforcements are of encircling design in the three height positions and in vertical planes in the region of the A- or hinge pillars, the B- or lock pillars, the C-pillars and at least one pillar in the rear wall.

German patent document DE 2853621A and U.S. Pat. No. 6,520,565, disclose a generic driver's cab supporting structure for a commercial vehicle, in which a safety cell is arranged in a driver's cab with a front region and a rear side facing a loading region. A seating region is surrounded by a stiff safety cell to which a deformation region for absorbing deformation energy is connected between seating region and loading region.

European patent document EP 1164073A discloses a driver's cab supporting structure, in which a cage-like safety cell is provided which maintains its original shape in the case of an impact.

Furthermore, European patent document EP 0685381A discloses a driver's cab supporting structure, in which a roll bar is used part of a cage-like driver's cab structure.

One object of the present invention to provide an improved driver's cab supporting structure for a commercial vehicle having a safety cell, particularly for a heavy commercial vehicle.

This and other objects and advantages are achieved by the driver's cab supporting structure according to the invention, in which a seating region is surrounded by a stiff, cage-like safety cell to which a deformation region for absorbing deformation energy is connected between seating region and loading region. Part of a longitudinal member behind the seating region is designed as a deformation region, so that a further compression volume can be made available. This design is suitable particularly for a short driver's cab without a living and sleeping region, in which a substantial compression volume is not available in the driver's cab itself. The deformation volume is preferably integrated in the longitudinal member behind the seating region and a support against a vehicle frame. The safety cell is particularly stiff, while the deformation region is especially pliable, so that the driver's cab is stiffened locally and is weakened in a specific manner locally, so as to provide a deformation zone.

The effect which can therefore be achieved is that, in the event of a rear-end collision (for example of truck against truck), in which a driver's cab is compressed until stiff structures of the colliding truck can be effectively supported, an adequate survival space for a driver in the colliding truck is maintained. This is advantageous particularly in the case of heavy commercial vehicles of several tens of tons, since, in a rear-end collision, kinetic energy can scarcely be supported via the driver's cab. An effective support therefore generally takes place on a frame of the above truck or its trailer. A superstructure penetrates the colliding driver's cab in accordance with a rear overhang and the elasticity of the front structure of the colliding commercial vehicle. The differing stiffness of the driver's cab according to the invention makes available a necessary compression volume behind the seating region, while the seating region is protected by the stiff safety cell. The safety cell can be displaced in essentially undeformed form while the kinetic energy is converted in the compression volume of the deformation region into deformation energy. Preferably, at least the driver's seat is surrounded by the stiff safety cell.

If the safety cell is displaceable relative to the vehicle frame, even if the protruding superstructure of the truck traveling in front dips inward, the safety cell can remain intact and a survival space can be maintained. If the driver's cab or the longitudinal member is affected by an impact, as a reaction the safety cell can move relative to the vehicle frame, and can conduct energy to the deformation region. The safety cell remains intact.

If the deformation region comprises part of the driver's cab, then, in the case of a driver's cab of sufficient size, preferably with a living and sleeping region behind the seating region, a large compression volume can be achieved. The driver's cab is preferably designed as a deformation region in the living or sleeping region arranged behind the seating region.

If the longitudinal member has an absorbing region which is mounted upstream of the safety cell, in the case of an accident an impact can be prevented from acting directly on the safety cell and, instead, the impact acts on the deformation region of the longitudinal member and, if appropriate, on an additional deformation region in front of the driver's cab.

If the longitudinal member is of L-shaped design, with a first arm of the longitudinal member being placed as an absorbing region in front of the safety cell and the safety cell being mounted on a second arm, a front region of the driver's cab can effectively be prevented from sustaining an intrusion. Impact energy can be diverted to the deformation region or regions.

If the safety cell is cuboidal, with cuboid edges being formed by roll bars, the safety cell favorably encapsulates the driver's and/or passenger's seat, and makes it easier to rescue occupants in the event of an accident.

If the safety cell is formed by separate driver's and passenger's cells, then, in the case of an impact on one side, the safety of the less affected cell can be increased, because the two cells are essentially decoupled or can be decoupled from each other in the event of an impact, and are at least movable in relation to each other. A connection between driver's cell and passenger's cell is expediently pliable or releasable, so that, in the event of deformation, the safety cells can be released from each other and can react independently of each other.

If an additional deformation region is mounted upstream of the safety cell, an additional compression volume can be provided and the safety of the occupants can be increased.

Other objects, advantages and novel features of the present invention will become apparent from the following detailed description of the invention when considered in conjunction with the accompanying drawings.

DETAILED DESCRIPTION OF THE DRAWINGS

In the figures, identical or corresponding parts are basically numbered with the same reference numbers.

Figure 1:
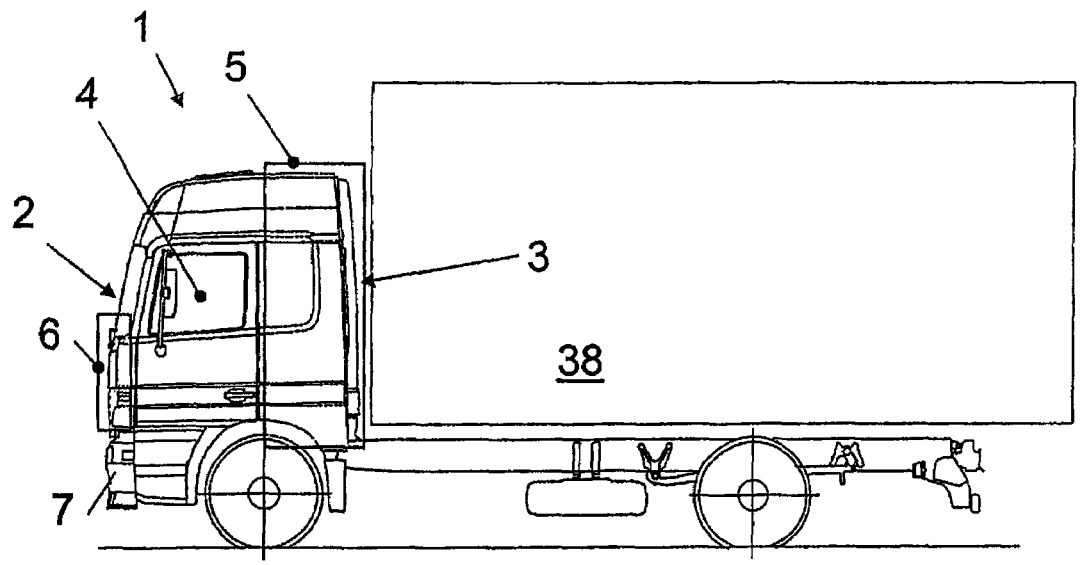
FIG. 1 shows, diagrammatically, a side view of a preferred commercial vehicle with deformation zones indicated, according to a first embodiment of the invention.

FIG. 1 shows, diagrammatically, a side view of a preferred embodiment of a commercial vehicle with deformation regions 5, 6, which comprise part of the driver's cab 1. A loading region 38, for example a trailer, is connected to a rear side 3 of the driver's cab 1. A deformation region 6 is arranged in a front region 2 of the driver's cab 1 and sits over an end piece 7 of a stiff vehicle frame. A further deformation region 5 is arranged in the region of the rear side 3. A safety cell 4 which surrounds a seating region (not designated specifically) is arranged between the deformation region 6 on the front side and the rear deformation region 5.

Figure 2:
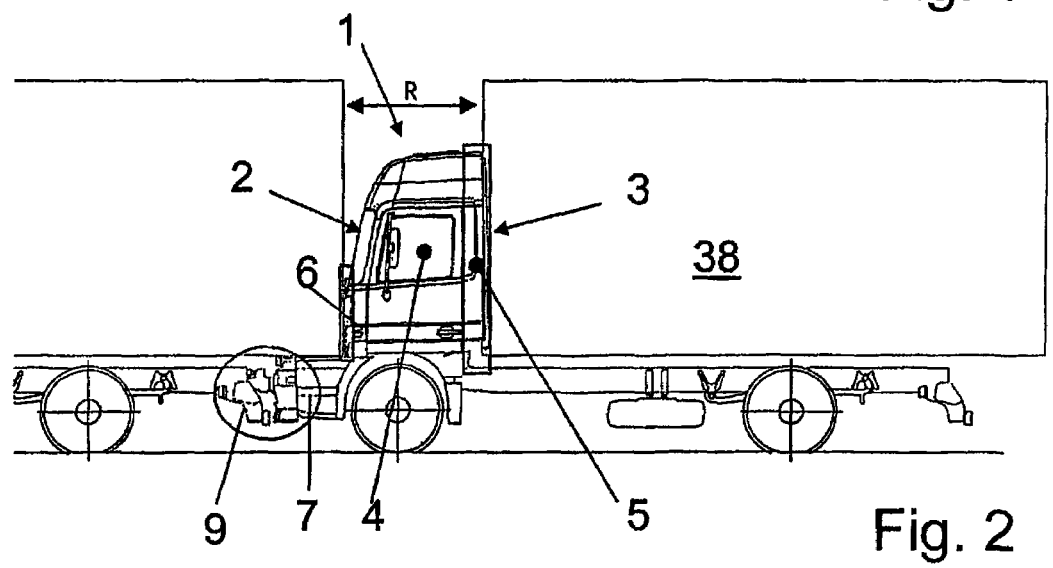
FIG. 2 shows a rear-end collision situation between a commercial vehicle and the preferred commercial vehicle from FIG. 1, with deformed deformation zones.

FIG. 2 shows the commercial vehicle from FIG. 1 in a rear-end collision situation, in which the colliding commercial vehicle is supported with its end piece 7 of the vehicle frame in a contact region 9 on the vehicle frame of the front commercial vehicle.

The driver's cab 1 is compressed in the deformation regions 5, 6 of the front region 2 and of the rear side 3, and the safety cell 4 is displaced rearward with respect to the vehicle frame (not designated specifically). A clearance R, within which the safety cell 4 is located, is maintained between the two trucks.

Figure 3:
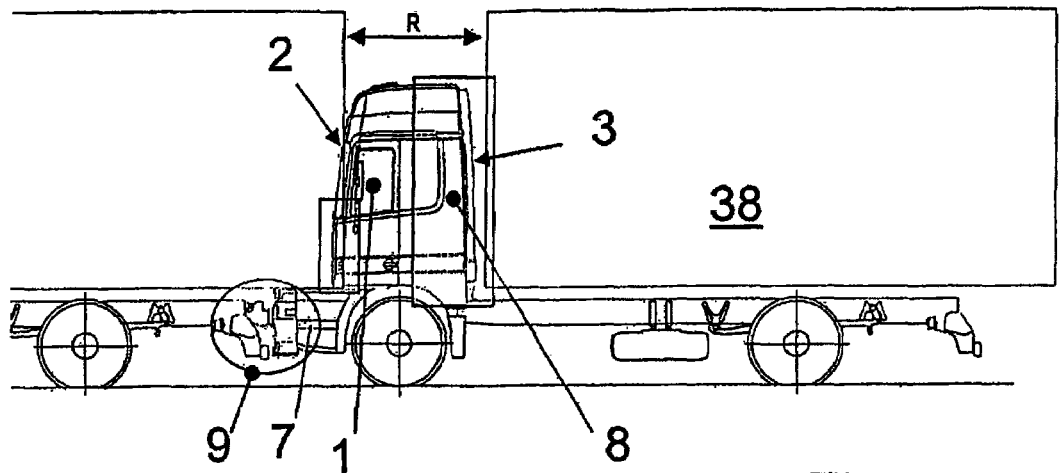
FIG. 3 shows a rear-end collision situation of two conventional commercial vehicles for comparison.

The situation with a conventional commercial vehicle is illustrated in FIG. 3 as a comparison. A conventional driver's cab 1 of overall stiff design is compressed from the front, and a region 8 on the rear side 3 of the driver's cab 1 remains intact if the vehicle frames of the two involved commercial vehicles strike against each other in the contact region 9.

Figure 4:
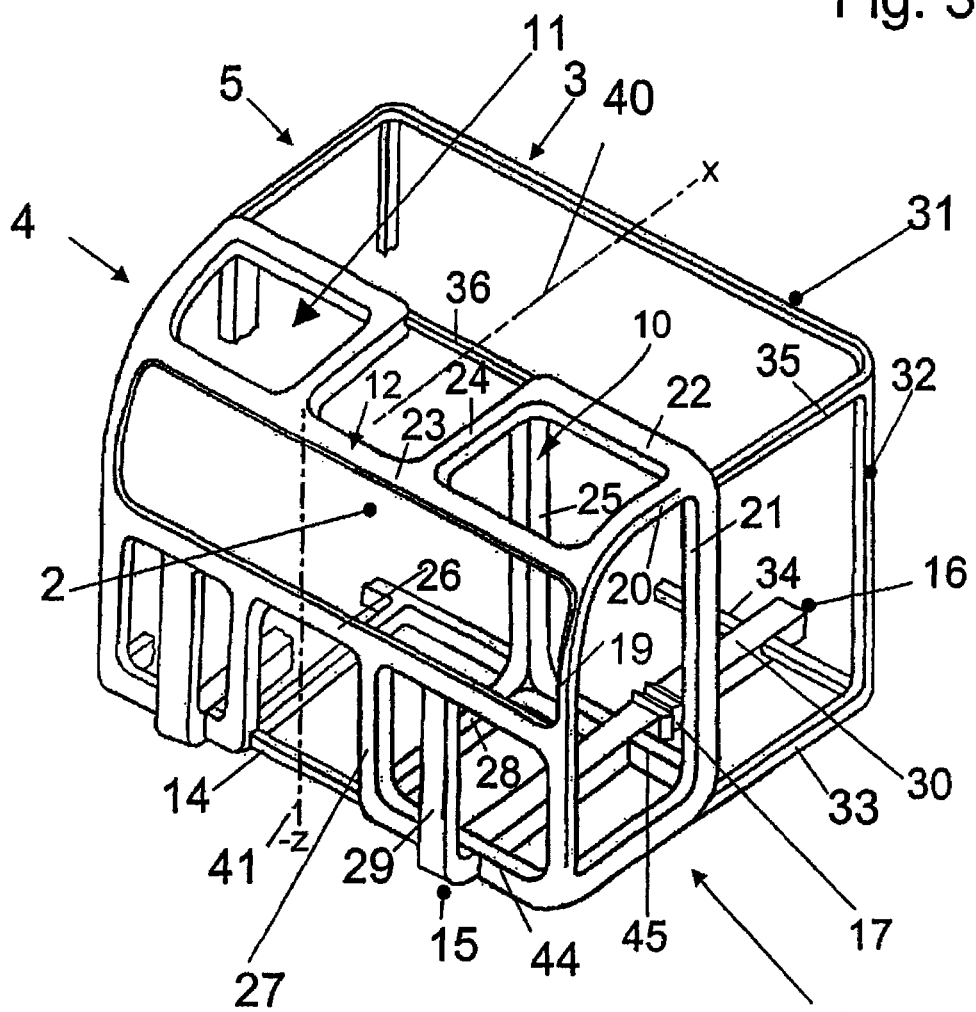
FIG. 4 shows a preferred safety cell.

FIG. 4 shows a preferred supporting structure of a driver's cab 1 with a safety cell 4. In the front region 2 (FIGS. 1 and 2) there is arranged a stiff, cage-like safety cell 4 to which a pliable deformation region 5 for absorbing deformation energy is connected. The deformation region 5, which is arranged between a seating region 13 and the loading region 38 from FIGS. 1, 2 is formed from pliable longitudinal struts 33, 35 transverse struts 31, 34 and vertical struts 32 and surrounds a living and sleeping region of the driver's cab 1.

The safety cell 4 is designed to accommodate driver's and passenger's seats (not illustrated), and is composed of a driver's cell 10 and a passenger's cell 11. The latter are connected on that side of the safety cell 4 which faces the rear 3 of the driver's cab 1 by a pliable strut 36 on the roof side and a pliable strut 14 arranged on the floor side in the front region. In the front region 2, a stiff transverse strut 12 on the roof side and a stiff transverse strut 26 connect driver's cell 10 and passenger's cell 11 level with a windshield railing.

The safety cell 4 is essentially symmetrical to a center line 40 on the roof and a center line 41 on the front. For the sake of clarity, only reference numbers for the driver's cell 10 are indicated.

The supporting structure according to the invention comprises at least the stiff safety cell 4 and the longitudinal member 30. In addition, in this exemplary embodiment, a pliable deformation region 5 is arranged adjoining the safety cell 4.

The driver's cab 1 is mounted on a driver's cab bearing 15 of a longitudinal member 30, in which a part behind the seating region 13 is designed as a deformation region 17.

The longitudinal member 30, which has an absorbing region 29 mounted upstream of the safety cell 4, is L-shaped, with the absorbing region forming a first arm 29 that is placed in front of the safety cell 4, which is mounted on a second arm the driver's cab 1. The safety cell 4 is designed such that it can be displaced with the longitudinal member 30 with respect to a vehicle frame. A rear driver's cab bearing 16 can be supported on the vehicle frame.

The safety cell 4 is cuboidal, with cuboid edges formed by stiff struts 18, 20, 24, 28 arranged along a vehicle axis, stiff struts 23, 22, 26, 44, 45 arranged transversely to the vehicle axis, and stiff struts 19, 21, 25, 27 arranged vertically. The vertical strut 25 forms a roll bar with the strut 22 arranged transversely. It is also possible to omit a vertical, stiff strut 25 behind the driver's seat, or to provide such a strut only in the driver's cell 10, in order to save weight.

A vehicle door (not illustrated) which is stiffened and/or reinforced can be provided in the door region 46 and, for example, has a conventional beam function with annular structures to assist in protection against a lateral penetration of deformation energy or to provide additional stiffening of the vehicle door in the case of head-on collisions.

Furthermore, a support for a dashboard (not illustrated) is provided in the driver's cab 1, so that, in the event of deformation, penetration of the dashboard into the safety cell 4 can be avoided.

Figure 5A:
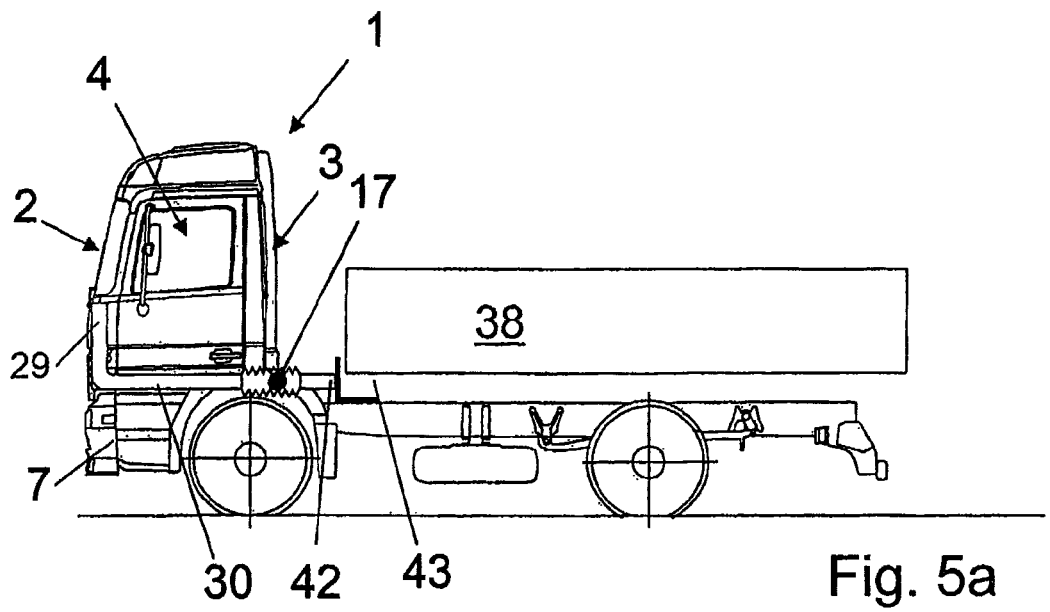
FIGS. 5a, b, c show a preferred commercial vehicle according to a second exemplary embodiment in side view (a), a detail of a deformation zone (b), and the deformation zone after a rear-end collision situation (c).
Figure 5B:
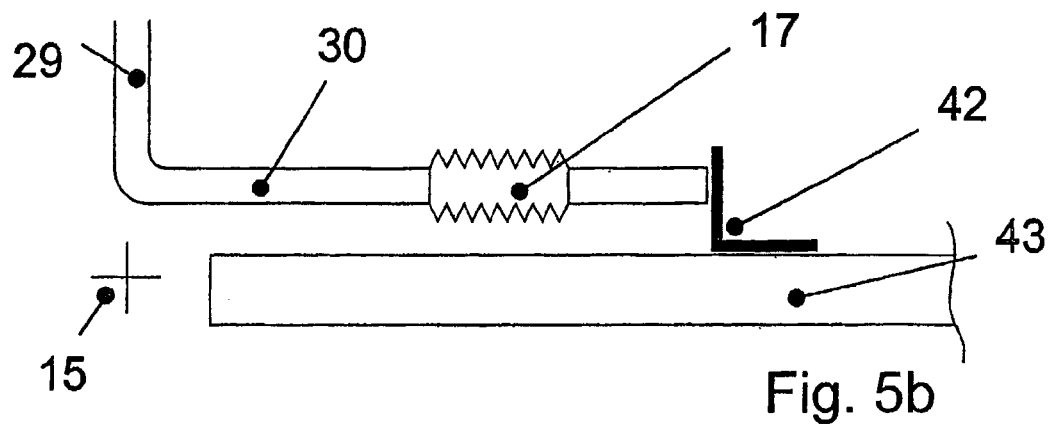

FIGS. 5a, b, c show a supporting structure of a driver's cab according to a second exemplary embodiment of the invention. The supporting structure comprises a stiff safety cell 4 and a longitudinal member 30 with an integrated deformation region 17 (FIG. 5a). The driver's cab 1 is of short design and does not have a living and sleeping region on the rear side 3. It is mounted on an L-shaped longitudinal member 30 which has an upwardly placed arm as absorbing region 29 in a front region 2 of the driver's cab 1. In the region of the rear side 3 of the driver's cab 1, a deformation region 17 is arranged in the longitudinal member 30, between a seating region 13, surrounded by a stiff, cage-like safety cell 4, and a support 42. Upon application of force from the front, the safety cell 4 can yield to the rear and can move in a specific manner relative to a vehicle frame 43. The support 42 supports the longitudinal member 30 against the vehicle frame 43 (FIG. 5b). FIG. 5b shows the longitudinal member 30 in the normal state. The safety cell 4 (not illustrated) sits between absorbing region 29 and deformation region 17. The driver's cab 1 is supported on a front driver's cab bearing 15.

Figure 5C:
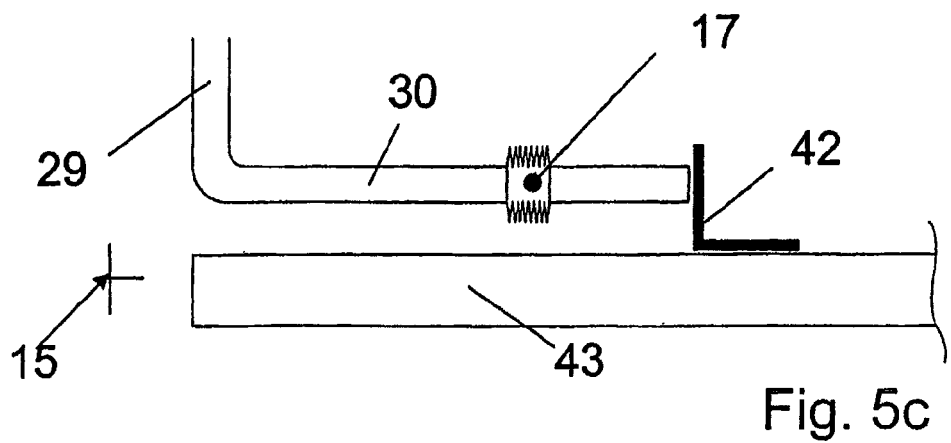

FIG. 5c shows the longitudinal member 30 in the deformed state after a rear-end collision. The front region of the longitudinal member 30, on which the safety cell 4 sits, is unchanged while the deformation region 17 is compressed. The deformation region 17 is arranged behind the driver's cab. If a force acts on the absorbing region 29, which is designed as the erected limb, such force is conducted via the longitudinal member 30 to the deformation region 17 where it is converted into deformation work. The safety cell 4 is displaced rearward in essentially undeformed form.

The deformation regions 5, 6, 17 are preferably formed from conventional crash structures, such as, for example, foldable or compressible structures of profiled material, such as tubes or U-supports and the like.

The invention can be integrated easily and in an uncomplicated fashion in drivers' cabs and is suitable particularly for cab-over-engine trucks which do not have a front structure on the front side for accommodating deformation regions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A driver's cab supporting structure for a commercial vehicle, said structure comprising:
    a stiff safety cell arranged in a driver's cab area, with a front region, and a rear side facing a loading region;
    a seating region surrounded by the stiff safety cell, to which a deformation region for absorbing deformation energy is connected between seating region and loading region; wherein,
    the safety cell has a cage configuration; and
    a part of a longitudinal member which is behind and below the seating region is configured as a deformation region, the longitudinal member extending to the front region of the safety cell.

2. The driver's cab supporting structure as claimed in claim 1, wherein the safety cell is displaceable relative to a vehicle frame.

3. A driver's cab supporting structure for a commercial vehicle, said structure comprising:
    a stiff safety cell arranged in a driver's cab area, with a front region, and a rear side facing a loading region;
    a seating region surrounded by the stiff safety cell, to which a deformation region for absorbing deformation energy is connected between seating region and loading region; wherein,
    the safety cell has a cage configuration;
    a part of a longitudinal member which is behind the seating region is configured as a deformation region; and
    wherein the deformation region comprises part of the driver's cab.

4. The driver's cab supporting structure as claimed in claim 3, wherein the driver's cab is designed as comprises a deformation region in a living or sleeping region arranged behind the seating region.

5. The driver's cab supporting structure as claimed in claim 1, wherein the deformation region is arranged between the seating region and a support against a vehicle frame.

6. The A driver's cab supporting structure for a commercial vehicle, said structure comprising:
    a stiff safety cell arranged in a driver's cab area, with a front region, and a rear side facing a loading region;
    a seating region surrounded by the stiff safety cell, to which a deformation region for absorbing deformation energy is connected between seating region and loading region; wherein,
    the safety cell has a cage configuration;
    a part of a longitudinal member which is behind the seating region is configured as a deformation region; and
    wherein the longitudinal member has an absorbing region upstream of the safety cell.

7. The driver's cab supporting structure as claimed in claim 6, wherein the longitudinal member is L shaped, with a first arm of the longitudinal member disposed in front of the safety cell, and the safety cell mounted on a second arm.

8. The driver's cab supporting structure as claimed in claim 1, wherein the safety cell has a cuboidal configuration, with cuboid edges being formed by roll bars.

9. The driver's cab supporting structure as claimed in claim 1, wherein the safety cell comprises separate driver's and a passenger's cells.

10. The driver's cab supporting structure as claimed in claim 1, wherein an additional deformation region is mounted upstream of the safety cell.

\* \* \* \* \*